(No Model.)

G. CLEF.
HEAD LIGHT FOR LOCOMOTIVES.

No. 259,819. Patented June 20, 1882.

WITNESSES:
Francis McArdle
C. Sedgwick

INVENTOR:
G. Clef
BY Munn & Co
ATTORNEYS.

UNITED STATES PATENT OFFICE.

GEORGE CLEF, OF PALATKA, FLORIDA.

HEAD-LIGHT FOR LOCOMOTIVES.

SPECIFICATION forming part of Letters Patent No. 259,819, dated June 20, 1882.

Application filed March 3, 1882. (No model.)

*To all whom it may concern:*

Be it known that I, GEORGE CLEF, of Palatka, in the county of Putnam and State of Florida, have invented certain new and useful Improvements in Head-Lights for Locomotives, of which the following is a full, clear, and exact description.

Reference is to be had to the accompanying drawings, forming part of this specification, in which similar letters of reference indicate corresponding parts in both the figures.

Figure 1:
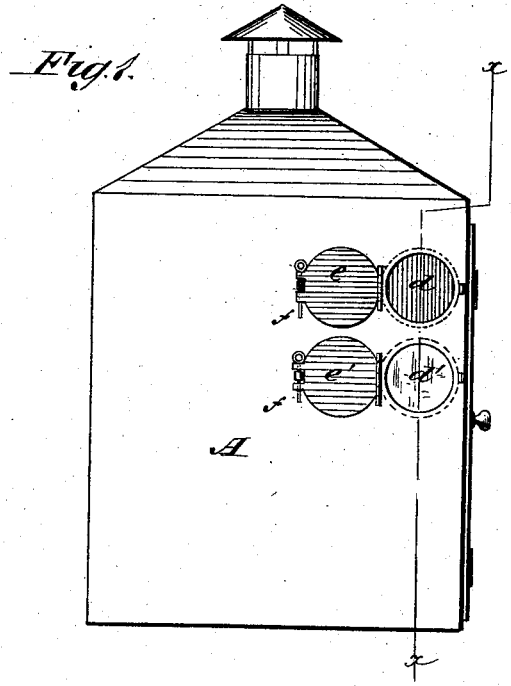
Figure 2:
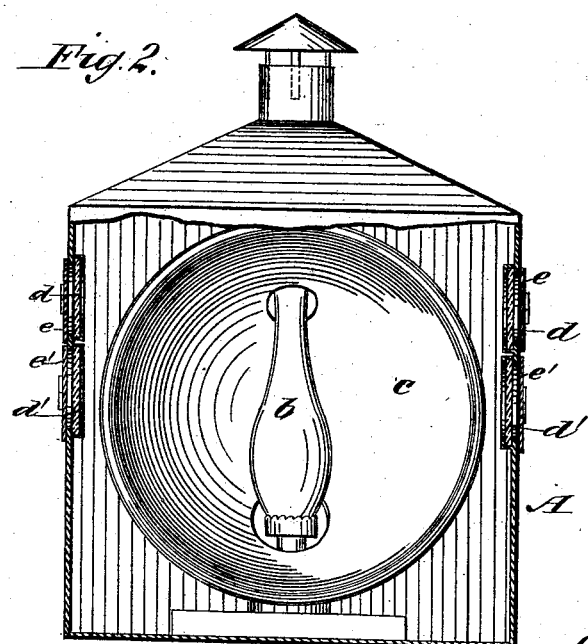

Figure 1 is a side view of a locomotive headlight with my invention applied, and Fig. 2 a vertical section of the same on the irregular line $x$ $x$ in Fig. 1.

This invention has for its object an extended use of the locomotive head-light by combining with its present or ordinary function the additional one of signaling as trains are now signaled by "flagging"—that is, by causing the engine to carry at night on its front a red or other suitably-colored light, as a red or other suitably-colored flag is carried by day, to indicate that another train or engine is following which has the same right to the road as the leading engine.

To this end the invention consists in providing a locomotive head-light with one or more bull's-eyes or glasses on one or both of its sides, but preferably on both of them, said bull's-eyes or glasses being made to show any desired colored light or lights, and being illuminated by the ordinary lamp or reflector of the head-light whenever shutters or covers with which said side glasses are provided are opened or removed for the purpose.

A in the drawings indicates the head-light of a locomotive-engine, $b$ its lamp, and $c$ its reflector.

Fitted in both sides of the head-light A are two bull's-eyes or glasses, $d$ $d'$, arranged to occupy a forward position in said sides, so that when exposed for illumination they will receive the light from the reflector $c$ of the head-light. These glasses $d$ $d'$, when thus illuminated, are made to show different colors. Thus the glasses $d$ may be made to exhibit a red light and the glasses $d'$ a white light; but these colors are arbitrary and others may be substituted for them, and, if desired, the glasses $d'$ exhibiting the white light may be altogether omitted. These several bull's-eyes or glasses $d$ $d'$ are each provided with hinged or other shutters or covers $e$ $e'$, which have combined with them bolts or fastenings $f$, that engage with appropriate attachments on the headlight for keeping said bull's-eyes dark when it is not necessary to expose a light through them, and for keeping them uncovered when it is required to illuminate them. When either pair of these bull's-eyes $d$ $d$ or $d'$ $d'$ are uncovered, sufficient of them will be seen from a distance, as illuminated by the reflector $c$ of the head-light, to make them answer the purpose of a signal. Thus the exposure of a red light through the glasses $d$ $d$ may be used to signal that another train or engine which has the same right to the road as the leading engine is following; or these glasses may be covered and the white glasses $d'$ $d'$ be exposed to signify that another train is following, but will be kept entirely out of way of regular trains or engines that are following; or these signals may be used for any other purpose or purposes that may be desired, and they may be made to display different-colored lights to those here described, and their glasses be of any desired shape.

In thus utilizing the head-light of a locomotive-engine for signaling purposes the signals are not liable to be misplaced as separate signaling appendages are, nor are the glasses exposed to being smoked or discolored, and as the same lamp or burner answers for the head-light proper, as for the signals $d$ or $d'$, the signals virtually do not consume any oil or burning-fluid. This will form a very important saving, especially on long lines of railroad.

Having thus fully described my invention, I claim as new and desire to secure by Letters Patent—

The combination, with a head-light having a lamp and reflector, arranged as described, of the pairs of side glasses, $d$ $d$ $d'$ $d'$, provided with hinged shutters $e$ $e'$ and bolts $f$, the latter engaging with attachments on the headlight for keeping said glasses covered or uncovered, for the purpose specified.

GEORGE CLEF.

Witnesses:
B. A. WEATHERS,
F. B. LIPPITT.